(12) United States Patent
Tanner et al.

(10) Patent No.: US 7,721,995 B2
(45) Date of Patent: May 25, 2010

(54) RIB SUPPORT FOR WING PANELS

(75) Inventors: Richard B. Tanner, Seattle, WA (US); Ian C. Burford, Duvall, WA (US); Thomas V. Gendzwill, Bellevue, WA (US); Gregory B. Doty, Edmonds, WA (US); James R. Huck, Woodinville, WA (US); Dean E. Wilson, Everett, WA (US); Brian H. Korenaga, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 147 days.

(21) Appl. No.: 11/610,444

(22) Filed: Dec. 13, 2006

(65) Prior Publication Data

US 2008/0210821 A1 Sep. 4, 2008

(51) Int. Cl.
*B64C 1/12* (2006.01)
(52) U.S. Cl. ...................................... 244/132
(58) Field of Classification Search ........... 244/123.1, 244/123.8, 131, 132
See application file for complete search history.

(56) References Cited

U.S. PATENT DOCUMENTS

| | | | | |
|---|---|---|---|---|
| 2,367,750 | A * | 1/1945 | Berkow et al. | 244/123.2 |
| 4,310,132 | A * | 1/1982 | Robinson et al. | 244/119 |
| 5,944,286 | A | 8/1999 | Morris et al. | |
| 6,386,481 | B1 | 5/2002 | Kallinen | |
| 6,730,184 | B2 | 5/2004 | Kondo et al. | |
| 6,739,553 | B2 | 5/2004 | Nunn, Jr. et al. | |
| 6,766,984 | B1 * | 7/2004 | Ochoa | 244/119 |
| 2001/0051251 | A1 | 12/2001 | Noda et al. | |
| 2004/0244334 | A1 * | 12/2004 | Kairouz | 52/790.1 |
| 2005/0263645 | A1 * | 12/2005 | Johnson et al. | 244/119 |
| 2006/0226287 | A1 * | 10/2006 | Grantham et al. | 244/119 |
| 2006/0231682 | A1 | 10/2006 | Sarh | |
| 2007/0102839 | A1 * | 5/2007 | McGowan et al. | 264/101 |

\* cited by examiner

*Primary Examiner*—Tien Dinh
*Assistant Examiner*—Richard R Green
(74) *Attorney, Agent, or Firm*—Yee & Associates, P.C.; Brett L. Halperin

(57) ABSTRACT

An innovative wing structure provides ribs to support skin panels without an attachment between the rib and the stringer free flange or the web. The support is provided by rib shear ties installed directly to the stringer skin flange. The rib incorporates a cut away to allow the stringer to pass through the rib. The composite stringer is an 'I' section and is stable under compression, not requiring mechanical methods to prevent rolling over.

9 Claims, 4 Drawing Sheets

RIB SUPPORT FOR WING PANELS

BACKGROUND OF THE INVENTION

1. Field of the Invention

This invention relates generally to the field of aircraft structural systems and more particularly to a rib structure and attachment system for composite wing panels.

2. Description of the Related Art

In aircraft structures, wing panels, which consist of skins and stringers, react wing bending loads. These loads and the resulting deflections produce upper wing compression buckling and a crushing load on ribs supporting the wing panels. The compression buckling capability for the panel is driven by geometry, rib spacing and stringer spacing. The boundary conditions for the panel are determined by the method of support the rib gives the skin/stringer.

Traditional aluminum panel design as shown in FIG. 1 provided panel support by attaching the rib 10 to the stringer 12 by means of a series of rib bolts 14 between the free flange 16 of the stringers and the associated rib chord flange 18. Skins 20 are attached to the stringer outer flanges 22 using fasteners. An alternative method is to attach a butterfly clip between the stringer web and the rib chord. These attachments provide column stability for the panel and do not let the stringer roll over. These designs are undesirable because they require installation while the wing box is being built. Drilling holes inside an enclosed wing box presents many challenges and provides a source for costly rework.

Further, if this rib bolt design is applied to a composite wing structure, it creates interlaminar tension problems in the stringer radius. This is a poor load path for the composite structure which may require reinforcement methods for the stringer radius adding more cost. The composite wing also needs disbond affestment fasteners common to the stringer and skin in addition to the rib to stringer attachment.

It is therefore desirable to provide structural elements that provide an improved load path for rib support of wing panels. It is further desirable that the structure not require drilling of holes inside an enclosed wing box.

SUMMARY OF THE INVENTION

The present invention provides an innovative structure for the ribs to support the panels without an attachment between the rib and the stringer free flange or the web. The support is provided by rib shear ties installed directly to the stringer skin flange. The rib incorporates a cut away to allow the stringer to pass through the rib. The composite stringer is an 'I' section and is designed to be stable under compression, not requiring mechanical methods to prevent rolling over.

This design provides further benefit in that all drilling can be done from outside the wing box facilitating automation, allowing fabrication which is much easier, less costly, and less prone to rework.

The wing skin attachment structure of the present invention provides a rib having shear ties at a surface profile and a plurality of cut aways proximate the shear ties. A plurality of stringers have skin flanges which are engaged by the shear ties and free flanges received through the cut aways. A plurality of fasteners attach the skin flanges to the shear ties. The ribs employed in the present invention further incorporate gussets extending from the shear ties adjacent the cut aways to transfer loads to the rib. In an exemplary embodiment, the fasteners engage a wing skin, the skin flange and the shear tie, the skin flanges incorporate tab outs proximate the shear ties and the free flanges incorporate tab outs proximate the cut aways.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1:
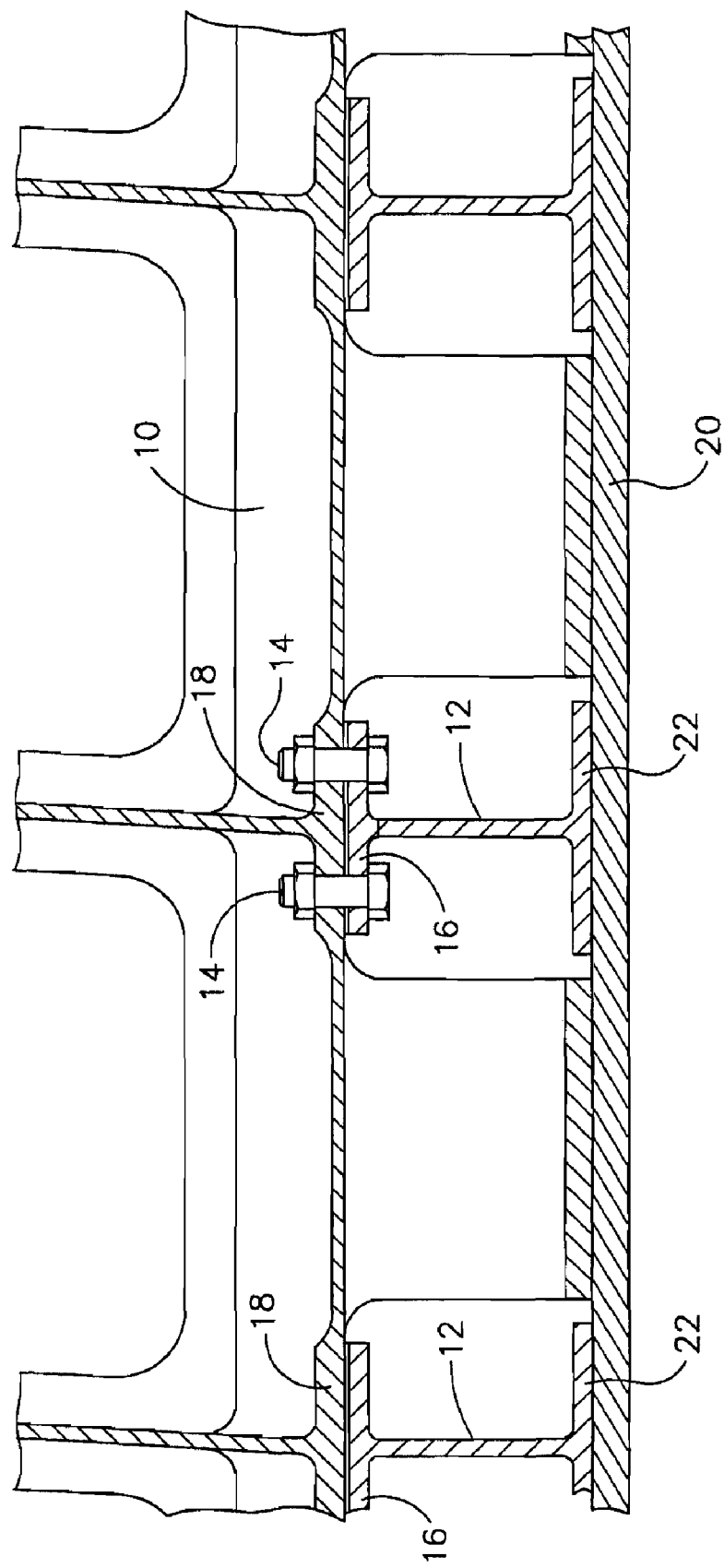
FIG. 1 is an elevation view of an exemplary prior art wing structure showing the rib and wing panel attachment elements.
Figure 2:
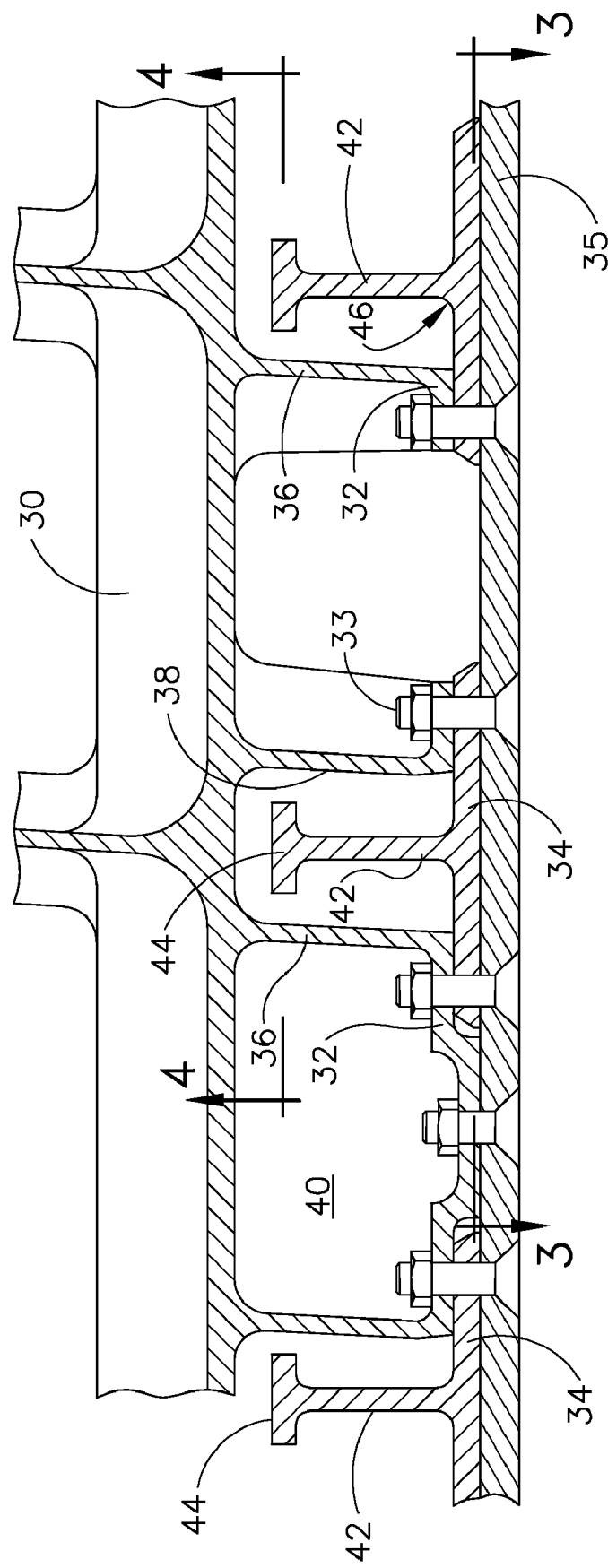
FIG. 2 is an elevation view of a rib and structural elements for wing panel attachment according to the present invention.

As shown in FIG. 2 the present invention provides a wing structure having ribs 30 which are fully shear tied. In the wing skin panels, stringer skin flanges 34 attach to shear ties 32 at an airfoil surface profile created by the rib using bolts or other combination tension/compression load path and disbond arrestment fasteners 33 which also attach the skin 35 for the embodiment shown.

The ribs are stiffened from the lower wing surface to the upper wing surface. To react to tension load pull off created by the stringer attachment to the shear ties at the ribs, the ribs have gussets 36 surrounding stringer cut aways 38 to help transfer skin panel attachment loads into the web 40 of the ribs while providing pass through of the stringers 42. These gussets act in concert with the rib stiffening for structural integrity of the ribs in conjunction with reacting to the pull off loads. For the embodiment shown in the drawings, the ribs are machined to provide the gussets and cutouts. In alternative embodiments the rib features are created by stamping, casting or forging.

Figure 3:
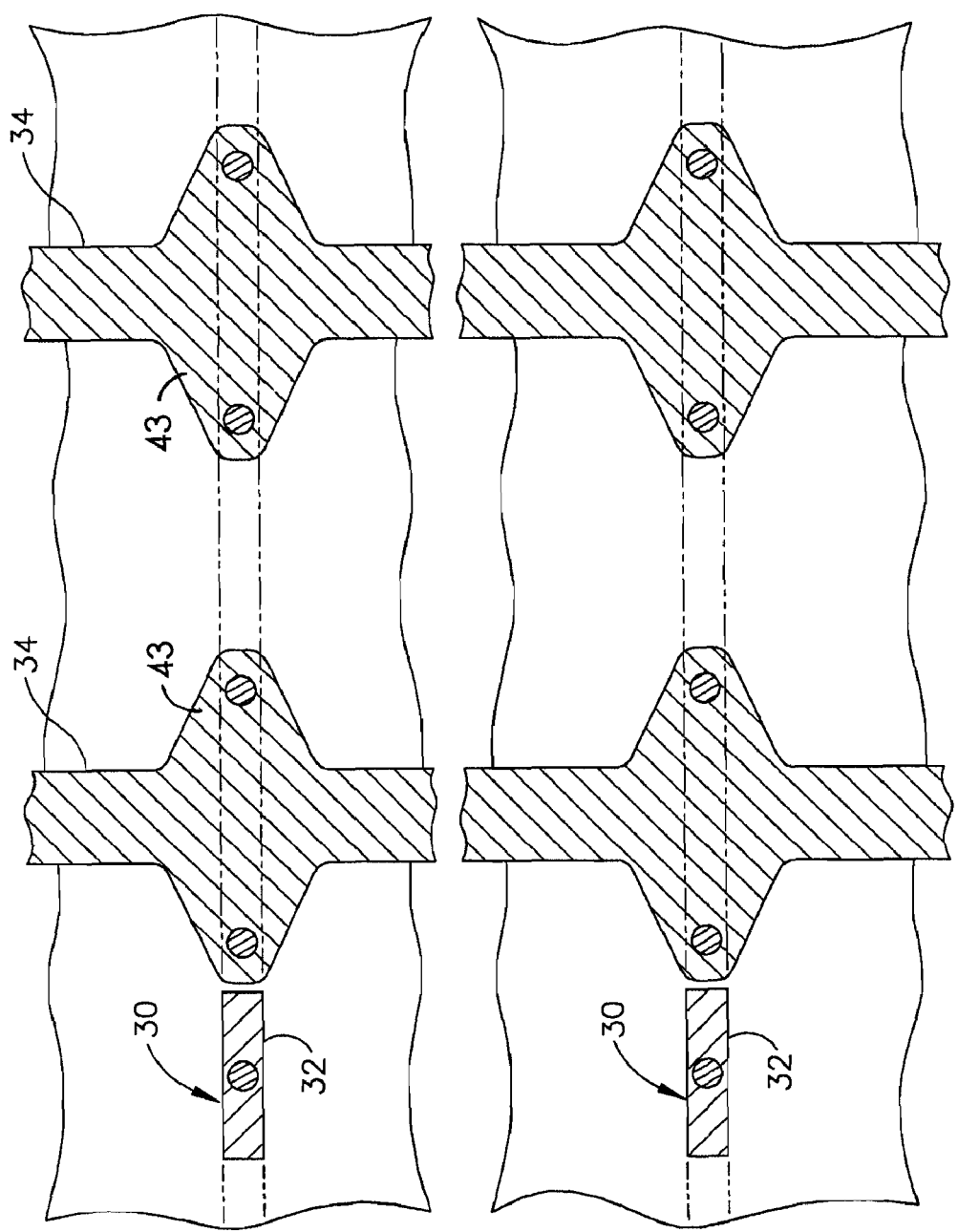
FIG. 3 is a section view along line 3-3 of FIG. 2 providing a plan view of the stinger and rib structure at the elevation of the stringer skin flange; and, FIG. 4 is a section view along line 4-4 of FIG. 2 providing a plan view of the stringer and rib structure at the stringer free flange.

The stringer skin flanges 34 are wide with a profile incorporating some local tab outs 43 at the ribs to accommodate the shear ties as shown in FIG. 3. Using fasteners common to the shear ties and skin attachment provide for disbond affestment and help with the damage tolerance of the design. This additionally limits the number of fasteners required in the wing box. The stringer free flange 44 is tabbed in at the ribs with tab ins 49 reducing the size of required cut-outs 38 to allow the ribs to get as close to the stringer radius 46 as possible where it sits on the skin flange. This reduces the load the stringer radius is required to react.

Figure 4:
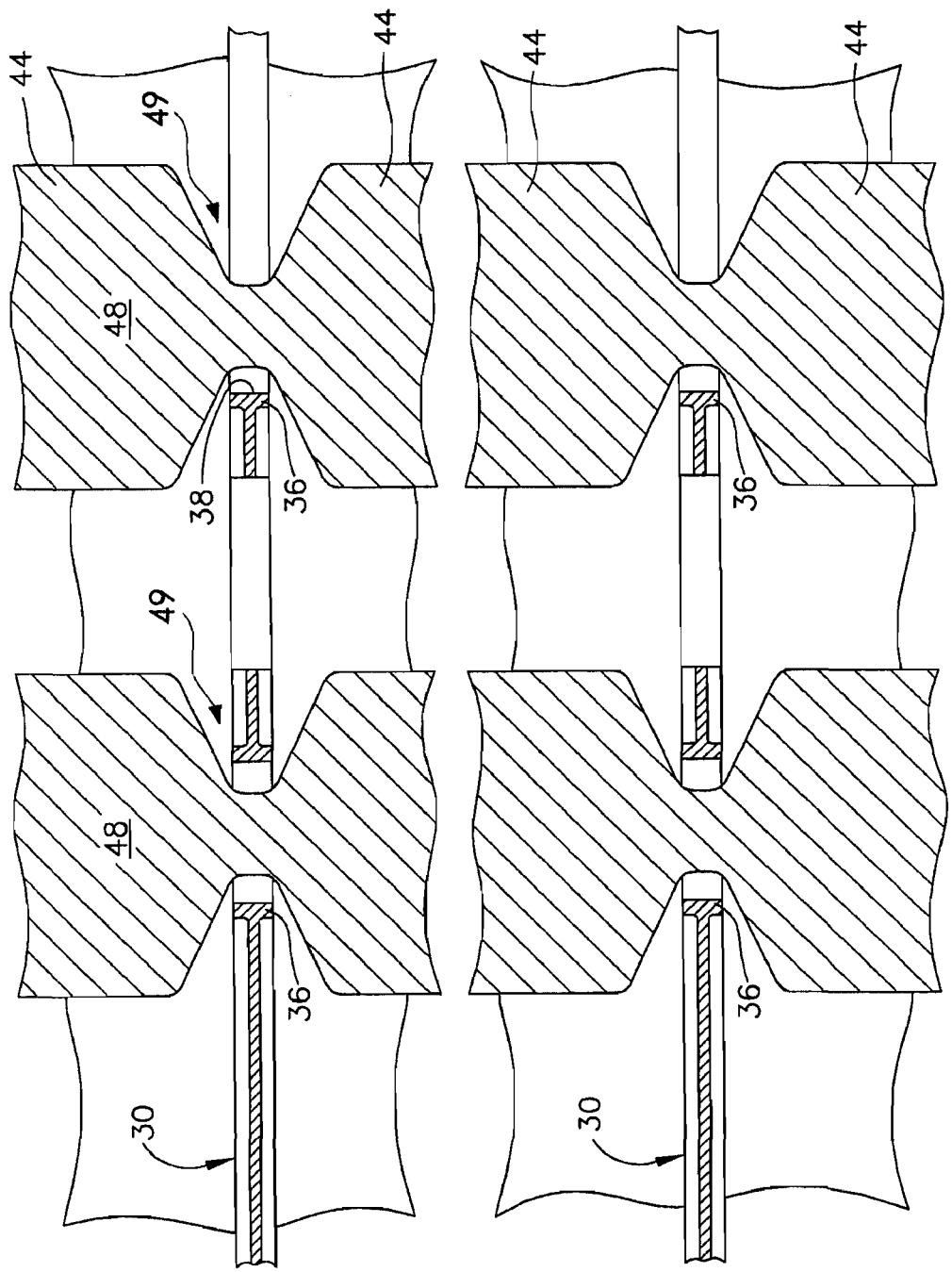

The wing skin panel is well supported at the rib so the critical location for buckling is between ribs. The profile of the stringer free flange includes inter-rib flange portions 48, as necessary, between the ribs to provide column stability as shown in FIG. 4. The inter-rib flange portions 48 are tailored to provide the desired structural stability while retaining the weight reduction capability of the designs incorporating the present invention.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A wing skin attachment structure comprising:
   a rib having a cut-away;
   a stringer in the cut-away, the stringer having a skin flange and an opposed free flange, the skin flange having a first surface engaging a wing skin and a second surface opposed to the first surface;
   a set of shear ties extending from the rib, the set of shear ties extending over and engaging the second surface of the skin flange; and
   a plurality of fasteners extending through the set of shear ties, the skin flange, and the wing skin for attaching the set of shear ties, the skin flange and the wing skin to one another;
   wherein the free flange comprises narrower tab in portions at the rib, and wider inter-rib flange portions to provide stability.

2. A wing skin attachment structure as defined in claim 1 wherein the rib further comprises gussets extending from the set of shear ties adjacent opposite sides of the cut-away to transfer loads to the rib.

3. A wing skin attachment structure as defined in claim 1 wherein the skin flange comprises tab outs to accommodate the set of shear ties.

4. An aircraft wing structure comprising
   a plurality of ribs, each rib of the plurality of ribs having a cut-away;
   a wing panel having a wing skin;
   a stringer in each cut-away, each stringer having a skin flange and a free flange opposed to the skin flange, the skin flange of each stringer having a first surface engaging the wing skin and a second surface opposed to the first surface;
   each rib of the plurality of ribs having a set of associated shear ties extending from the rib, the set of associated shear ties extending over and engaging the second surface of skin flange of each stringer in its respective cut-away; and
   a plurality of fasteners extending through the set of associated shear ties, the skin flange of each stringer, and the wing skin for attaching the set of associated shear ties, the skin flange of each stringer and the wing skin to one another;
   wherein the free flange of each stringer comprises narrower tab in portions at the rib, and wider inter-rib flange portions to provide stability.

5. An aircraft wing structure as defined in claim 4 wherein each rib further comprises gussets extending from the set of associated shear ties adjacent opposite sides of the cut-away to transfer loads to each rib.

6. An aircraft wing structure as defined in claim 4 wherein the skin flange of each stringer comprises tab outs to accommodate the set of associated shear ties.

7. A method of manufacturing an aircraft wing structure comprising the steps of:
   providing a plurality of ribs, each rib of the plurality of ribs having a cut-away and a set of associated shear ties extending from the rib;
   providing a stringer in each cut-away, each stringer having a skin flange and a free flange opposed to the skin flange, the skin flange of each stringer having a first surface engaging a wing skin of the aircraft wing structure, and a second surface opposed to the first surface;
   extending the set of associated shear ties over the second surface of the skin flange for engaging the second surface of the skin flange; and
   extending a plurality of fasteners through the set of associated shear ties, the skin flange of each stringer, and the wing skin for attaching the set of associated shear ties, the skin flange of each stringer and the wing skin to one another;
   wherein the providing a stringer step further comprises forming the free flange of each stringer with narrower tab in portions at the rib, and wider inter-rib flange portions to provide stability.

8. A method of manufacturing an aircraft wing structure as defined in claim 7, further comprising providing each rib of the plurality of fibs with gussets that extend from the set of associated shear ties adjacent opposite sides of the cut-aways to transfer loads to each rib.

9. A method of manufacturing an aircraft wing structure as defined in claim 7, wherein the providing a stringer step further comprises forming the skin flange of each stringer with tab outs to accommodate the set of associated shear ties.

* * * * *